United States Patent [19]
Iida et al.

[11] 3,873,193
[45] Mar. 25, 1975

[54] FILM REWIND DEVICE IN A CINECAMERA

[75] Inventors: Yozo Iida; Hideyo Nozawa; Shigeo Akasaka, all of Tokyo, Japan

[73] Assignee: Nippon Kogaku K.K., Tokyo, Japan

[22] Filed: Feb. 16, 1973

[21] Appl. No.: 333,125

[30]     Foreign Application Priority Data
    Feb. 21, 1972  Japan.............................. 47-21382

[52] U.S. Cl. ............... 352/72, 352/91 S, 242/71.2, 242/199, 242/68.3
[51] Int. Cl. .......................................... G03b 23/16
[58] Field of Search............ 352/72, 78 R, 156, 174, 352/91 S; 242/71.2, 194, 197, 198, 199, 200, 68.3

[56]         References Cited
          UNITED STATES PATENTS

| | | | |
|---|---|---|---|
| 2,401,632 | 6/1946 | Greenleaf | 242/54.1 |
| 2,422,635 | 6/1947 | Steiner | 242/194 |
| 3,236,468 | 2/1966 | Foret | 242/199 |
| 3,348,786 | 10/1967 | Miller et al. | 242/68.3 X |
| 3,514,197 | 5/1970 | Sho | 352/91 S |
| 3,689,137 | 9/1972 | Yozo | 352/91 S |
| 3,695,551 | 10/1972 | Yozo | 242/194 |
| 3,700,317 | 10/1972 | Koeber | 242/200 |
| 3,712,720 | 1/1973 | Winkler | 352/91 S |
| 3,756,534 | 9/1973 | Keiner et al. | 242/194 |

*Primary Examiner*—Fred L. Braun
*Assistant Examiner*—Alan Mathews
*Attorney, Agent, or Firm*—Shapiro and Shapiro

[57]          ABSTRACT

A cinecamera using a film magazine having reverse rotation preventing means at the take-up side thereof includes drive means engageable with a take-up core in the magazine to rotate the core in take-up direction, and meansa provided in the body of the camera for stopping the drive means to transport a film loosely into a take-up chamber. A resilient member is attached to the camera for engagement with the take-up core to interrupt the rotation of the core caused by the transport of the film into the take-up chamber when the take-up action of the take-up core is stopped.

4 Claims, 5 Drawing Figures

FILM REWIND DEVICE IN A CINECAMERA

BACKGROUND OF THE INVENTION

1. Field of the Invention

This invention relates to a film rewind device in a cinecamera.

2. Description of the Prior Art

In a cinecamera employing a film magazine of known construction means is provided for preventing the take-up core from rotating in a direction opposite to take-up direction to avoid film slack within the take-up chamber of the magazine. In this prior art device a predetermined amount of the film is loosely transported into the take-up chamber by means of a film transport claw. With the rotation of the take-up shaft, which is engaged with the take-up core to rotate it in take-up direction, stopped, then such amount of the film may be loosely rewound into the supply chamber of the magazine. With a camera of this kind, the take-up core is sometimes rotated in take-up direction by the force with which the film is loosely transported into the take-up chamber while the take-up shaft is stopped. When rotation thus caused has occured, the take-up core cannot rotate in the reverse direction during the film rewind operation because of the reverse rotation preventing means of the magazine. As a result, only an insufficient amount of the film is loosely rewound into the supply chamber; or the film perforations are damaged; or, due to the insufficient amount of the film rewound, the resultant motion picture is pronouncedly unnatural. The performance of the camera is lessened.

The above-described undesirable rotation of the take-up core is attributable to (I) some idling which is present in the interconnecting mechanism between the take-up shaft and the take-up core, and/or (II) the character of the means for interrupting the take-up operation. More specifically, where interrupting the take-up operation involves restraining the rotation of the take-up shaft by means of a friction clutch disposed between the take-up shaft and the drive source while connecting the take-up shaft to its drive source, only the take-up shaft may rotate an amount corresponding to the amount of idling which results from cause (I) above. Where the interruption of the take-up operation involves complete disconnection between the take-up shaft and its drive source by means of a clutch, any frictional force of the take-up shaft less than the force with which the film is transported to the take-up shaft will cause undesirable rotation of the take-up shaft because of (I) and (II) above.

SUMMARY OF THE INVENTION

It is a general object of the present invention to provide a film rewind device which eliminates the above-described causes of undesirable rotation of the take-up core and overcomes the above-noted disadvantages.

According to the present invention, a cinecamera using a film magazine having reverse rotation preventing means at the take-up side thereof comprises drive means engageable with a take-up core in the magazine to rotate the core in take-up direction, and means provided in the body of the camera for stopping the drive means to transport a film loosely into a take-up chamber. According to the essential feature of the present invention, the cinecamera has a resilient member attached thereto for engagement with the take-up core to interrupt the rotation of the core caused by transporting the film into the take-up chamber when the take-up action of the take-up core is stopped. The resilient member may be secured to the drive means of the camera. The drive means may include an engaging member for engaging a motor with the take-up core and a transmission member for connecting the motor to the engaging member. In this form of the invention, the resilient member may be provided on the engaging member, and the transmission member disconnects or releases the engagement between the engaging member and the motor when the film is loosely transported with the take-up action stopped.

According to another feature of the present invention, the cinecamera may further comprise a member for restraining the engaging member at the same time that the transmission member releases the connection between the engaging member and the motor. The force of frictional engagement between the take-up core and the resilient member prevents undue rotation of the core resulting from the film transport force. Such frictional force is much less than the force exerted by the drive member.

BRIEF DESCRIPTION OF THE DRAWINGS

The invention will become fully apparent from the following detailed description of some embodiments thereof, taken in conjunction with the accompanying drawings, in which:

FIG. 2b is an enlarged perspective view of the film take-up disc in FIG. 2a.

DESCRIPTION OF THE PREFERRED EMBODIMENTS

Figure 1:
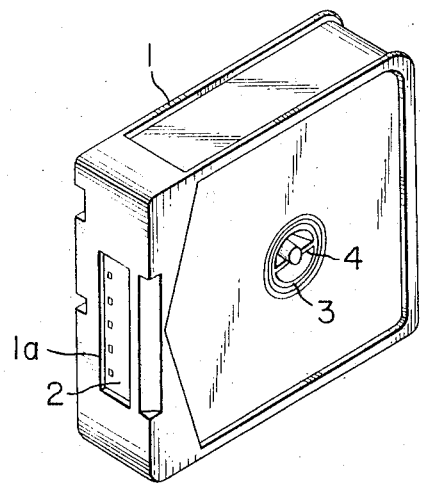
FIG. 1 is a perspective view of a film magazine of a known variety for use with a camera according to the present invention.

Referring to FIG. 1, a film magazine 1 is provided with means for preventing the reverse rotation of a take-up core 3 as known in the art. The magazine has an exposure opening 1a in the front end face thereof for exposing a film 2 therethrough. The take-up core 3 has film wound thereon by a film transport claw or like means (not shown) at the exposure opening. The take-up core 3 has an integral hub 4 which may be drivingly engaged by a take-up member provided in a cinecamera which will be hereinafter described.

Figure 2A:
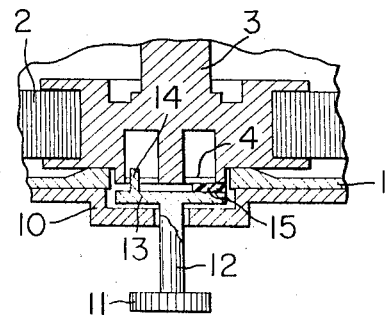
FIG. 2a is a cross-sectional view showing the connection between the take-up core in the film magazine and the take-up shaft in the camera, this view showing one embodiment of the invention.
Figure 2B:
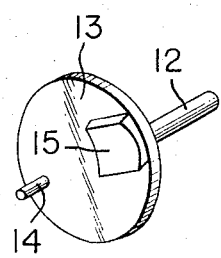

Referring to FIG. 2, a gear 11 is provided for operative engagement with a drive means such as drive motor of a cinecamera as known in the art. The gear 11 is secured to a shaft 12 which is supported by the body 10 of the camera, the shaft transmitting the rotation of a drive motor M in FIG. 3 to a take-up disc 13 through the intermediate gear 11. The take-up disc 13 has a take-up member or projection 14 secured or extended therefrom, which is in driving engagement with the hub 4 of the take-up core 3. The drive or rotation of the drive motor may thus be transmitted to the take-up core 3 through gear 11, shaft 12 and take-up disc and member 13, 14 to take up or wind the film 2 in take-up direction by the film transport means or claw at the exposure opening 1a of the film magazine. The gear 11, shaft 12, take-up disc 13 and take-up member 14 together constitute the take-up portion of the camera.

Still referring to FIG. 2, a resilient member 15, preferably made of rubber, is provided on or secured to the take-up disc 13. With the take-up portion 11, 12, 13, 14 of the camera being interrupted from rotation in order to loosely transport the film in the take-up chamber, the resilient member 15 may be brought into frictional engagement with the magazine take-up core 3 or hub 4 by a resilient force somewhat greater than the force with which the film is transported by the film transport means or claw, whereby the take-up core 3 can not be unduly rotated and the film 2 which has been positively transported can be stored loosely within the take-up chamber so that no harm or injury is caused during film rewinding. This arrangement and relationship of resilient means with respect to the take-up disc and take-up core or hub eliminates the undesirable rotation of the take-up core which would otherwise result from the above-described cause (I).

In the arrangement of FIG. 2, when the force with which the film is loosely transported is even a little greater than the frictional force which may occur between the shaft 12 and the body 10, then the core 3 and the camera's take-up portion 11-14 and resilient member 15 may all rotate together. To prevent such occurrence, the rotation of the take-up portion may be restrained by an arrangement as shown in FIG. 3.

Figure 3:
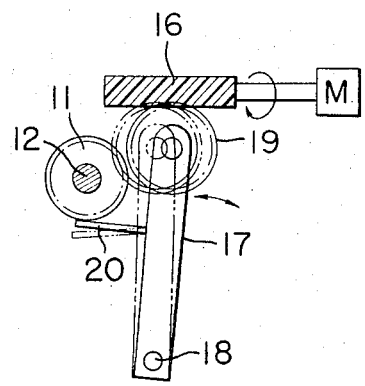
FIG. 3 illustrates another embodiment of the invention, a clutch member for the take-up shaft and a restraining member for the take-up shaft being shown.

Referring to FIG. 3, reference numerals 11 and 12 designate the gear and shaft, respectively as shown in FIG. 2. A worm 16 is operatively connected to the drive motor. A lever 17 is pivoted about a shaft 18, and a gear 19 is rotatably supported on the opposite end of the lever. The gear 19 is formed for meshing engagement with both the worm 16 and the gear 11 for selectively coupling worm 16 to gear 11. The pivoted gear 19 constitutes a clutch member, which may be displaced in the directions of the double-headed arrow. In the full-line position of the gear or clutch 19 the gear 11 is disconnected from the worm 16 so that the film is loosely transported into the take-up chamber. In the opposite or dotted line position, the gear 19 connects the gear 11 to the worm 16. A restraining member or pawl 20 is secured to the lever 17 for engaging and restraining the gear 11 in response to the declutching operation of the clutch member 19, thereby preventing the rotation of the take-up shaft which would otherwise result from the aforesaid cause (II). Thus, the rotation of the take-up core 3 which would be caused by the force of film transport can be completely prevented by the action of the resilient member 15 in the embodiment of FIG. 2 and by the action of the restraining member 20 in FIG. 3.

Figure 4:
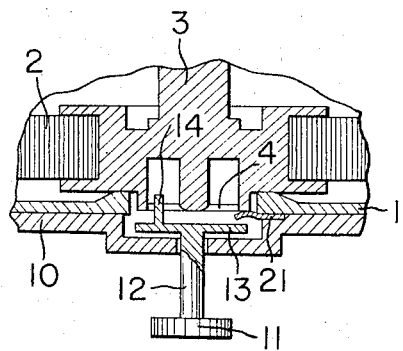
FIG. 4 is a view similar to FIG. 2 showing still another embodiment of the invention.

The embodiment of FIG. 4 is designed to eliminate the undesirable rotation of the take-up core which would result both from the idling of the interconnecting mechanism between the take-up shaft and the take-up core and from the character of the means for interrupting the take-up operation. In FIG. 4, the members designated by the reference numerals 1 to 4 and 10 to 14 correspond respectively to those given the same reference characters in FIG. 2. In this form of the invention, a leaf spring 21 is secured to the body 10, the spring being similar in construction to the resilient member 15 of FIG. 2. The leaf spring 21 acts to impart a suitable amount of frictional force upon the take-up core 3 by sliding engagement therewith or with its hub 4 as shown. This frictional force is slightly greater than the rotational force of the take-up core so that the take-up core cannot be rotated by transporting of the film.

The above-described structures enable, in the camera using a film magazine having means for preventing the reverse rotation of the take-up core, a camera to afford work such as double photography or the like by a film rewinding operation wherein the amount of the film loosely transported to the take-up chamber may be positively rewound, thus preventing occurrence of any undesirable accident or inconvenience.

It is believed that the advantages and improved results furnished by the cinecamera and film magazine of the invention will be apparent from the foregoing detailed description of the several embodiments of the invention. Various modifications and changes may be made without departing from the spirit and scope of the invention as sought to be defined in the following claims.

We claim:

1. Apparatus in a cinecamera using a film magazine having an opening for exposure and having means for preventing reverse rotation of a take-up core in a take-up chamber of the magazine, the apparatus comprising drive means, rotatable means having means engageable with the take-up core for causing rotation of the take-up core with the rotatable means, and coupling means for coupling the drive means to the rotatable means to rotate the drive means and the take-up core, the improvement comprising a resilient member provided on the rotatable means and engageable with the take-up core for opposing rotation of the take-up core relative to the rotatable means.

2. Apparatus as set forth in claim 1, wherein the coupling means comprises clutch means for selectively coupling the drive means to the rotatable means, and wherein said apparatus further comprises means for preventing rotation of the rotatable means when the rotatable means is not coupled to the drive means by said clutch means.

3. Apparatus as set forth in claim 2, wherein the means for preventing rotation is fixed to the clutch means and engageable with the rotatable means.

4. Apparatus as set forth in claim 1, wherein the means engageable with the take-up core for causing rotation of the take-up core with the rotatable means comprises a projection.

* * * * *